(12) United States Patent  
Dingler et al.

(10) Patent No.: US 12,337,410 B1
(45) Date of Patent: Jun. 24, 2025

(54) SYSTEMS AND METHODS FOR FILLING A VOID ON AT LEAST ONE METAL WORKPIECE

(71) Applicant: United Launch Alliance, L.L.C., Centennial, CO (US)

(72) Inventors: Johnny W Dingler, Cullman, AL (US); Stan Blados, Columbus, OH (US)

(73) Assignee: United Launch Alliance, L.L.C., Centennial, CO (US)

( * ) Notice: Subject to any disclaimer, the term of this patent is extended or adjusted under 35 U.S.C. 154(b) by 76 days.

(21) Appl. No.: 18/160,266

(22) Filed: Jan. 26, 2023

(51) Int. Cl.
 *B23K 20/12* (2006.01)
 *B23K 103/10* (2006.01)

(52) U.S. Cl.
 CPC ........ *B23K 20/126* (2013.01); *B23K 2103/10* (2018.08)

(58) Field of Classification Search
 CPC .............. B23K 20/126; B23K 2103/10; B23K 20/122–128
 USPC ....................................... 228/112.1, 2.1, 119
 See application file for complete search history.

(56) References Cited

U.S. PATENT DOCUMENTS

| | | |
|---|---|---|
| 5,971,252 A | 10/1999 | Rosen et al. |
| 5,975,406 A | 11/1999 | Mahoney et al. |
| 6,213,379 B1 | 4/2001 | Takeshita et al. |
| 6,543,671 B2 | 4/2003 | Hatten et al. |
| 6,742,697 B2 | 6/2004 | McTernan et al. |
| 7,858,897 B2 * | 12/2010 | Beranger ............... B23K 28/00 29/402.13 |
| 8,348,136 B1 | 1/2013 | Potter et al. |
| 8,439,250 B2 | 5/2013 | Takeshita et al. |
| 8,540,134 B2 | 9/2013 | Bezaire et al. |
| 9,409,253 B2 | 8/2016 | Matlack et al. |
| 9,815,152 B2 | 11/2017 | Foucher et al. |
| 2003/0217452 A1 * | 11/2003 | Talwar ............... B23K 20/1295 29/402.14 |
| 2005/0040209 A1 * | 2/2005 | Stotler ................. B23K 20/123 228/2.1 |
| 2005/0279810 A1 * | 12/2005 | Stol .................... B23K 20/1225 228/2.1 |

(Continued)

FOREIGN PATENT DOCUMENTS

| | | | | |
|---|---|---|---|---|
| CN | 104227226 A | * | 12/2014 | ............. B23K 20/12 |
| CN | 104275548 A | * | 1/2015 | ........... B23K 20/126 |

(Continued)

OTHER PUBLICATIONS

India Patent Application No. 925/KOL/2011, filed Jul. 8, 2011, by Bharat Heavy Electricals Limited, 9 pages.

(Continued)

*Primary Examiner* — Kiley S Stoner
(74) *Attorney, Agent, or Firm* — Sheridan Ross P.C.

(57) ABSTRACT

A welding system and method for filing a void on a metal workpiece is provided. The workpiece includes a first surface and an opposite second surface. The system and method may include a metal insert configured to fill the void and a welder configured to perform a friction stir welding process on the metal workpiece. The metal insert may be capable of being positioned adjacent the first surface. The system and method may also include an anvil capable of being positioned in an interior space of the workpiece, adjacent to the second surface, and opposite the welder.

11 Claims, 8 Drawing Sheets

(56) References Cited

U.S. PATENT DOCUMENTS

| | | | | |
|---|---|---|---|---|
| 2009/0179065 | A1* | 7/2009 | Maciel | B23K 20/1295 228/2.1 |
| 2011/0062219 | A1* | 3/2011 | Bezaire | B23K 20/1285 228/114.5 |
| 2011/0068150 | A1* | 3/2011 | Baumann | B23K 20/122 228/2.1 |
| 2014/0217154 | A1* | 8/2014 | Obaditch | B23K 20/126 228/2.1 |
| 2015/0336204 | A1* | 11/2015 | Singh | B23K 20/129 228/101 |
| 2017/0120373 | A1* | 5/2017 | Edwards | B23K 20/1255 |
| 2019/0111513 | A1* | 4/2019 | Rose | B23K 20/128 |
| 2020/0101559 | A1 | 4/2020 | Rose et al. | |

FOREIGN PATENT DOCUMENTS

| | | | | |
|---|---|---|---|---|
| CN | 104718045 | A * | 6/2015 | B23K 20/1225 |
| CN | 106029284 | B * | 6/2018 | B23K 20/123 |
| CN | 108098249 | | 6/2018 | |
| CN | 108941881 | A * | 12/2018 | B23K 20/122 |
| CN | 109570730 | A * | 4/2019 | |
| CN | 110434453 | A * | 11/2019 | |
| CN | 110579164 | A * | 12/2019 | B23K 20/122 |
| CN | 110640392 | A * | 1/2020 | B23K 20/1255 |
| CN | 111266787 | A * | 6/2020 | B23K 20/126 |
| CN | 108723575 | B * | 10/2020 | B23K 20/1225 |
| CN | 112388226 | A * | 2/2021 | B23K 20/126 |
| CN | 112536524 | A * | 3/2021 | |
| CN | 114932304 | A * | 8/2022 | |
| CN | 114932305 | A * | 8/2022 | |
| EP | 1132167 | A2 * | 9/2001 | B23K 20/122 |
| EP | 1864747 | A1 * | 12/2007 | B23K 20/122 |
| EP | 1916051 | A1 * | 4/2008 | B23K 15/0066 |
| JP | H11197855 | A * | 7/1999 | |
| JP | 2001138073 | A * | 5/2001 | B23K 20/126 |
| JP | 3920286 | B2 * | 5/2007 | B23K 20/12 |
| KR | 20211006173 | A * | 1/2021 | |
| WO | WO-2013119154 | A1 * | 8/2013 | B23K 20/1225 |
| WO | WO-2013119155 | A1 * | 8/2013 | B23K 20/12 |
| WO | WO-2021003914 | A1 * | 1/2021 | B23K 20/126 |

OTHER PUBLICATIONS

Reimann et al. "Refilling termination hole in AA 2198-T851 by refill friction stir spot welding," Journal of Materials Processing Technology, 2017, vol. 245, pp. 157-166.

* cited by examiner

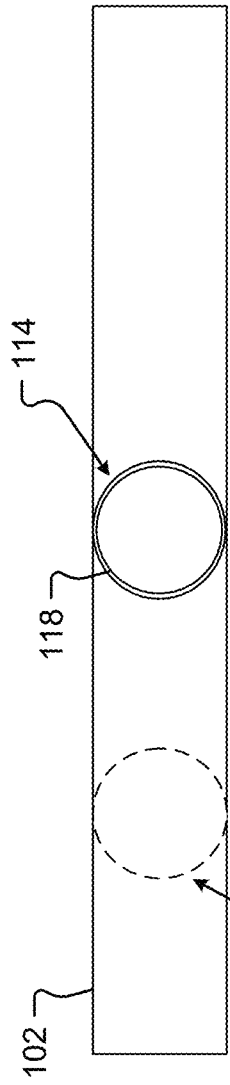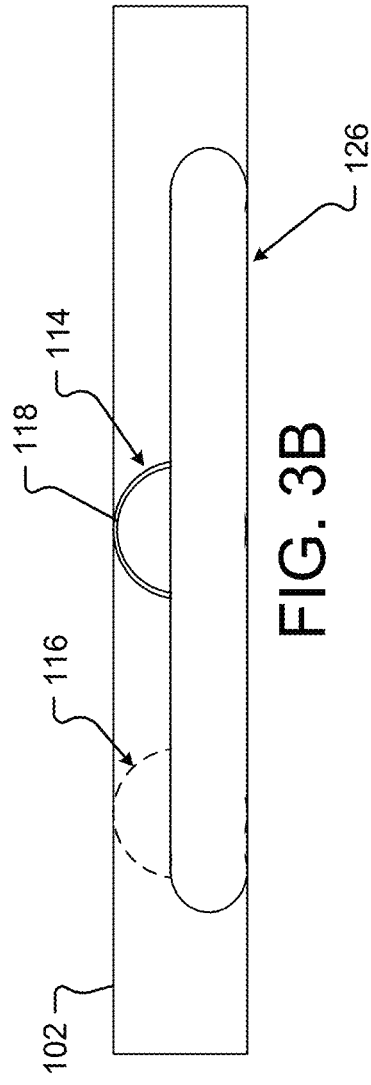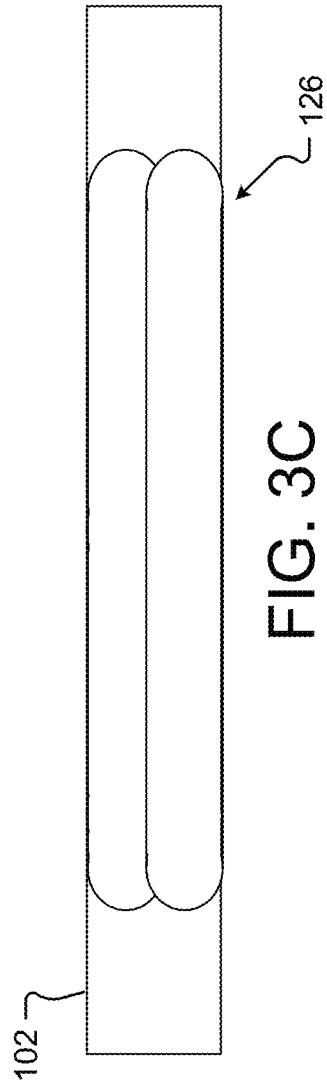

SYSTEMS AND METHODS FOR FILLING A VOID ON AT LEAST ONE METAL WORKPIECE

FIELD

The present technology is generally related to filling a void and in particular, to systems and methods for filling a void on at least one metal workpiece.

BACKGROUND

Self-reacting friction stir welding (SR-FSW) has become a desired process for welding, for example, aluminum cylindrical and spherical workpieces where internal access to the workpiece is limited. The SR-FSW process utilizes a crown and root shoulder design connected by a weld pin that eliminates the use of large internal tooling used by some conventional welding processes. However, SR-FSW processes result in a termination void or hole in the workpiece after completion of the SR-FSW process due to the weld pin. Such termination void or hole is then conventionally sealed or filled in by friction plug welding, manual fusion welding, or use of a bolt and nut or bolt and collar to plug the void. However, such conventional filler or plugs may leak, require large capital investment in additional welding systems, may not be used on certain aluminum alloys, and/or may not be effective on workpieces greater than ½" thick.

SUMMARY

The techniques of this disclosure generally relate to filling a void on a workpiece having an enclosed interior or space.

A welding system for filing a void on a metal workpiece, the workpiece having a first surface and an opposite second surface, according to at least one embodiment of the present disclosure comprises a metal insert configured to fill the void; a welder configured to perform a friction stir welding process on the metal workpiece and the metal insert and capable of being positioned adjacent the first surface; and an anvil capable of being positioned adjacent the second surface and opposite the welder, the anvil configured to couple to the workpiece by at least one of a clamp and a fastener.

Any of the aspects herein, wherein the workpiece and the insert are aluminum alloys.

Any of the aspects herein, wherein the void is a result of a self-reacting friction stir welding process.

Any of the aspects herein, wherein the workpiece comprises a wall forming a partially enclosed volume, the wall having a first edge extending between the first and second surfaces, and wherein the clamp is configured to attach to the first edge of the wall.

Any of the aspects herein, wherein the clamp is connected to the anvil by an extension arm.

Any of the aspects herein, wherein the wall has a second edge spaced from the first edge and the clamp comprises a first clamp attached to the first edge and a second clamp attached to the second edge.

Any of the aspects herein, wherein the wall forms a cylinder.

Any of the aspects herein, wherein the anvil and the workpiece are stationary and the welder is movable relative to the workpiece.

Any of the aspects herein, wherein the welder is stationary and the workpiece and the anvil are movable relative to the welder.

Any of the aspects herein, wherein the welder comprises a rotatable pin that is extendable and retractable and configured to weld the insert and the workpiece by rotating and extending into the workpiece, moving along a trajectory until the insert is welded to the workpiece, and retracting from the workpiece.

Any of the aspects herein, wherein, in a first step, the pin extends gradually into the workpiece as the pin moves along the trajectory and, in a second step, the pin withdraws gradually from the workpiece as the pin moves along the trajectory.

A welding system for filing a void on a workpiece according to at least one embodiment of the present disclosure comprises a metal insert configured to fill the void; a welder configured to perform a friction stir welding process on the workpiece and the metal insert; and an anvil capable of being positioned opposite the welder with the workpiece positioned between the welder and the anvil, the anvil comprising at least one expandable member configured to couple the anvil to the workpiece via a press fit.

Any of the aspects herein, wherein the workpiece comprises a wall forming a partially enclosed volume and having an interior surface, a first edge and a second edge spaced from the first edge, wherein the expandable member extends between the first edge and the second edge along the interior surface and the anvil abuts the interior surface within the partially enclosed volume.

Any of the aspects herein, wherein the wall forms a cylinder, wherein the anvil abuts the interior surface of the cylinder at a first location and the expandable member extends from the anvil across the cylinder interior and abuts the interior surface of the cylinder at a second location diametrically opposite the first location.

A method for filling a void in a workpiece according to at least one embodiment of the present disclosure comprises providing a workpiece, the workpiece having a wall defining an internal volume, the wall having a first side defining an exterior surface and a second side opposite the first side, the second side defining an interior surface; positioning a metal insert in the void; positioning a welder on along the exterior surface, the welder comprising a retractable pin configured to rotate; positioning an anvil along the interior surface and within the internal volume, the anvil configured to provide a backing to the retractable pin; and welding the metal insert to the workpiece by rotating and pressing the retractable pin into the workpiece, moving the retractable pin along a trajectory until the metal insert is welded to the workpiece and fills the void, and retracting the retractable pin from the workpiece.

Any of the aspects herein, wherein the workpiece and the insert are aluminum alloys.

Any of the aspects herein, wherein the wall of the workpiece forms a cylinder.

Any of the aspects herein, wherein the void is a result of a self-reacting friction stir welding process.

Any of the aspects herein, wherein the anvil and the workpiece are stationary and the welder is movable relative to the workpiece.

Any of the aspects herein, wherein the welder is stationary and the workpiece and the anvil are movable relative to the welder.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 3A is a schematic top view of a welding process according to at least one embodiment of the present disclosure;

FIG. 3B is a schematic top view of a welding process according to at least one embodiment of the present disclosure;

FIG. 3C is a schematic top view of a welding process according to at least one embodiment of the present disclosure;

DETAILED DESCRIPTION

Figure 1:
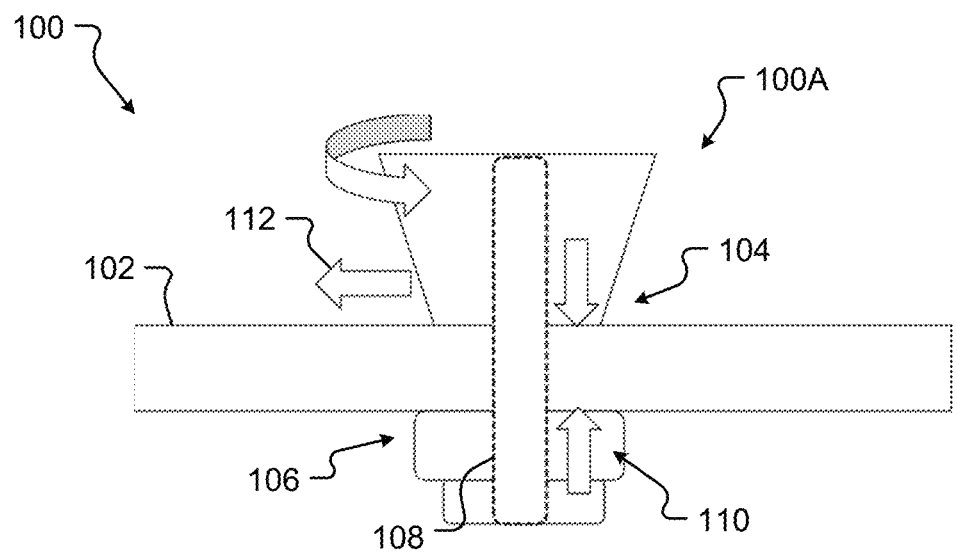
FIG. 1 is a schematic side view of a welding system according to at least one embodiment of the present disclosure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, an adapter and/or a welding machine.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

Figure 2:
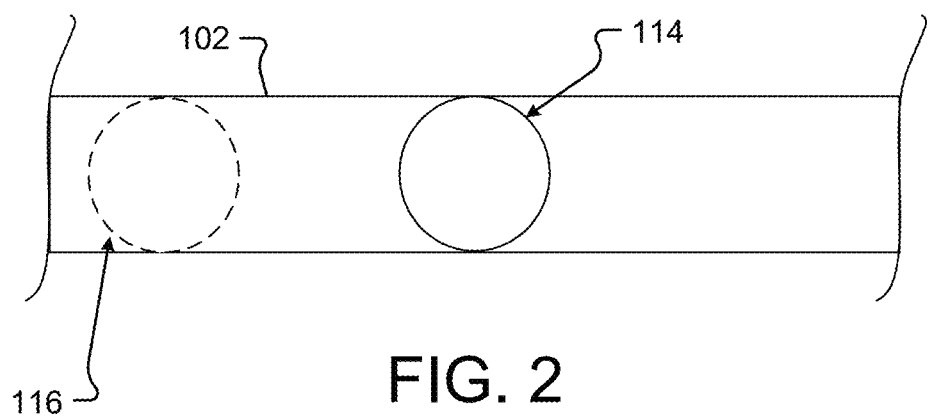
FIG. 2 is a schematic top view of a portion of a workpiece according to at least one embodiment of the present disclosure.

FIG. 1 illustrates a welding system 100 for welding a workpiece 102. The welding system 100 may be a self-reacting friction stir welding (SR-FSW) system 100A and the workpiece 102 may comprise, for example, aluminum cylindrical and spherical sections of a tank (e.g., spacecraft propellant tanks). It will be appreciated that the workpiece 102 may be any type of metallic material (e.g., aluminum alloy, steel, titanium, etc.) and/or shape. In embodiments where the workpiece 102 is a tank, welding the tanks are limited in the ability to apply internal tooling due to the limited access to the interior of the tank. Thus, welding systems 100 such as the SR-FSW system 100A uses a crown 104 and a root 106 design connected by a weld pin 108 that eliminates the use of large internal tooling used in conventional friction stir welding systems. The crown 104 and the root 106 form a pinch force 110 on the workpiece 102 and the weld pin 108 is rotatable and forms heat when rotated on the workpiece 102. As the SR-FSW system 100A is moved along a trajectory 112, the combination of the pinch force and the heat from the weld pin 108 welds the workpiece 102. However, as shown in FIG. 2 and previously described, SR-FSW systems typically leave a void 114 such as a termination hole in the workpiece 102 where the pin 108 is withdrawn at the end of a welding process that must be plugged or sealed. It will be appreciated that the void 114 may also be a result of damage to the workpiece 102 or weld defects and that the present disclosure can be also used to repair workpieces 102. A startup location 116 is also shown in FIG. 2 and correlates to a location where the SR-FSW system 100A begins a welding process.

Turning to FIGS. 3A-3C, a first, second, and third schematic view of a progression of a method of plugging or sealing the void 114 (whether as a result from a SR-FSW process or damage to of defect in the workpiece 102) is shown. In such embodiments the welding system 100 may comprise a friction stir welding (FSW) system 100B (shown in FIG. 4). An insert 118 may be placed in the void 114, as shown in FIG. 3A. The insert 118 may be, for example, aluminum, though in other embodiments the insert 118 may be any type of material (e.g., aluminum alloy, steel, titanium, etc.). In embodiments where the void 114 comprises a hole, the insert 118 is cylindrical so as to fit into the void 114. In other instances, the insert 118 may be any shape to fit the void 114. When the insert 118 is positioned in the void 114, the FSW system 100B may be used to weld the insert 118 in place. The FSW system 100B may comprise an anvil 120 (shown in FIGS. 4-8) internally positioned within the workpiece 102 and opposite a welder 122 having a pin 124 (also shown in FIGS. 4-8). The pin 124 is rotatable and is configured to extend from or retract towards the welder 122. During a welding process, a shoulder of the welder 122 and the pin 124 is rotated and the pin 124 extended into the workpiece 102. The rotation of the pin 124 and a forge force exerted by the welder 122 onto the workpiece 102 results in frictional heat used to weld the workpiece 102 and/or the insert 118. Thus, as shown in FIGS. 3B and 3C, the FSW system 100B can be used to weld one or more weld paths 126 until the insert 118 is welded to the workpiece 102 thereby sealing the void 114. In some embodiments, the FSW system 100B can be used to weld or consume both the startup location 116 (e.g., a location where the SR-FSW system 100A begins its welding process) and the void 114. The one or more weld paths 126 may comprise one weld path, two weld paths, or more than two weld paths. The one or more weld paths 126 may be linear, may be circular around the insert 118, or may form a trajectory of any shape.

It will be appreciated that the welding system 100 used to initially weld the workpiece 102 may be different from the welding system 100 used to seal the void 114. For example, the welding system 100 may comprise the SR-FSW system 100A to initially weld the workpiece 102 and the welding system 100 may comprise the FSW system 100B to fill or seal the void 114 on the workpiece 102. In such examples, a user may already have both an SR-FSW system 100A and an FSW system 100B for other uses and thus may save a user from purchasing a new or specialized welding system for filling voids. Further, FSW systems 100B can be used to weld 7000 series aluminum, which may not be welded by other welding processes such as, for example, fusion welding. Additionally, FSW systems 100B can be used to weld workpieces 102 having a thickness exceeding about 0.5" thicknesses.

Figure 4:
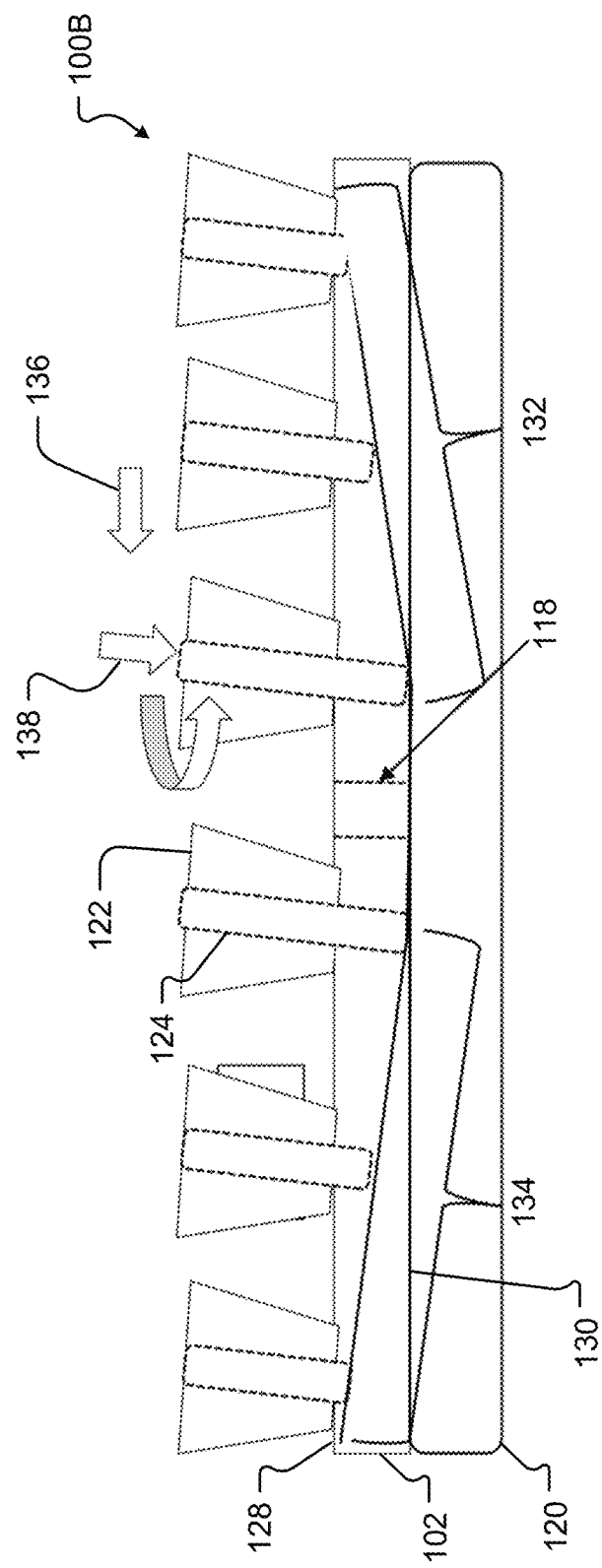
FIG. 4 is a schematic side cross-sectional view of a welding process according to at least one embodiment of the present disclosure.

Turning to FIG. 4, a schematic side cross-sectional view of the method of plugging or sealing the void 114 with the insert 118 is shown using the FSW system 100B. As described above, the FSW system 100B may be used to weld the insert 118 to the workpiece 102 to seal the void 114. More specifically, during a welding process, the welder 122 is positioned adjacent a first surface 128 of the workpiece 102 and the anvil 120 is positioned adjacent a second surface 130 of the workpiece 102 opposite the first surface 128. The anvil 120 may have a length or an arc length of about 3 feet or less depending upon the workpiece dimensions. In other embodiments the anvil 120 may have a length or an arc length greater than 3 feet.

During the welding process, the pin 124 is configured to rotate, extend or retract into the workpiece 102, and to move along a trajectory 136 to weld the insert 118 to the workpiece 102. In general, at a first step 132, the pin 124 extends gradually into the workpiece 102 as the pin 124 moves along the trajectory 126 and, in a second step 134, the pin 124 withdraws gradually from the workpiece 102 as the pin 124 moves along the trajectory. More specifically, the pin 124 begins at a beginning of the trajectory 136 and as the pin 124 is moved towards the insert 118, the pin 124 is extended into the workpiece 102. The combination of the rotation of the pin 124, a force 138 exerted by the welder 122, and the anvil 120 positioned opposite the welder 122, welds the workpiece 102 by friction stir welding. As the pin 124 passes through the insert 118, the pin 124 may be extended substantially through the workpiece 102 and towards the anvil 120. Once the pin 124 is past the insert 118, the pin 124 may be retracted away from the anvil 120 and out of the workpiece 102. Such welding process may result in the insert 118 being fully incorporated or welded to the workpiece 102, thereby preventing any leaks from the void 114.

Figure 6:
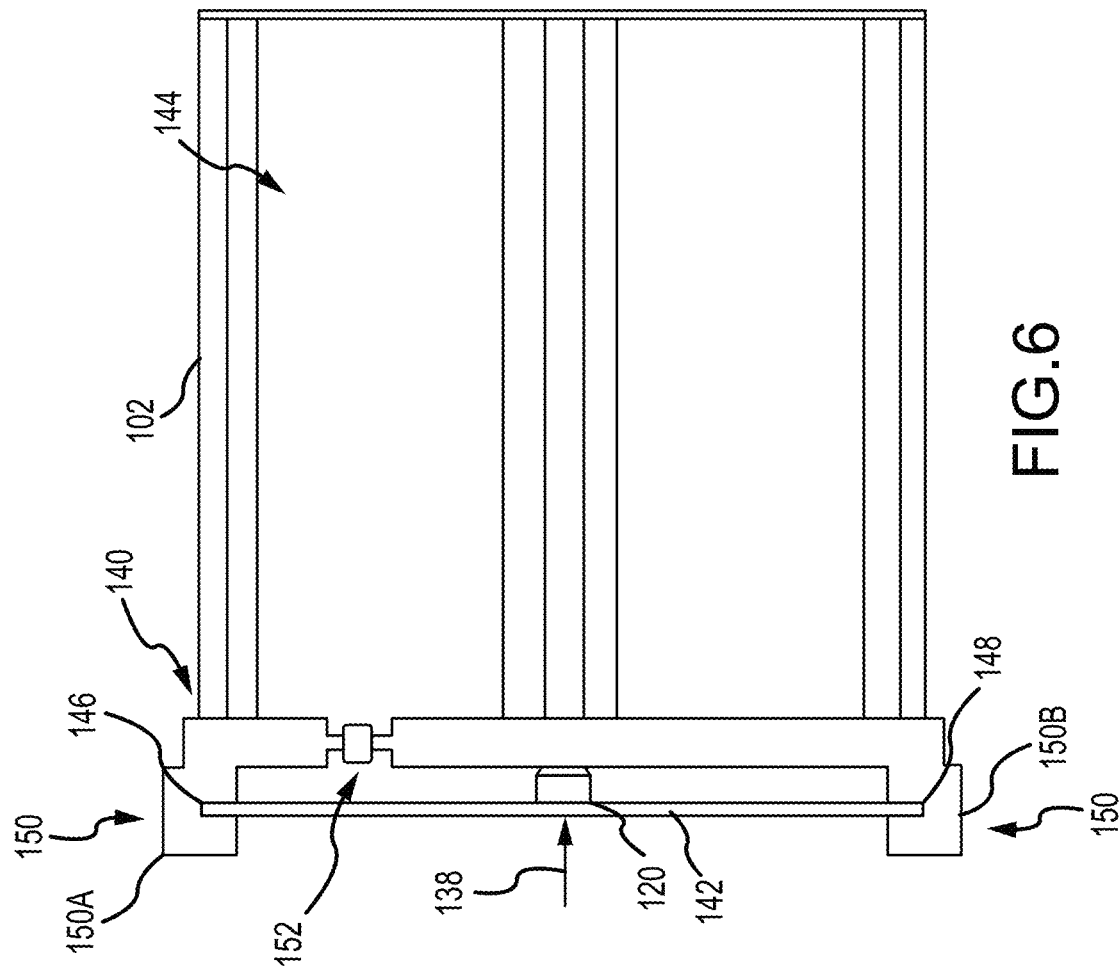
FIG. 6 is a schematic side cross-sectional view of the anvil of FIG. 4 according to at least one embodiment of the present disclosure.
Figure 5:
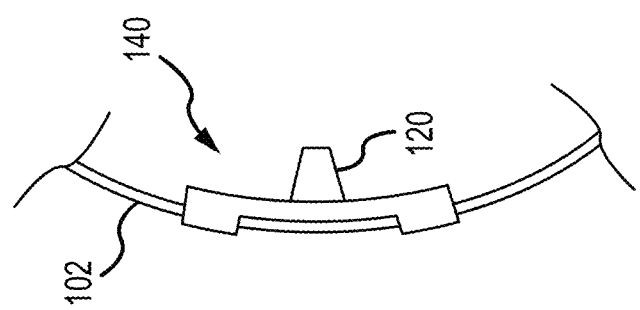
FIG. 5 is a schematic top view of an anvil according to at least one embodiment of the present disclosure.

Turning to FIGS. 5 and 6, a schematic top view and a schematic side view of a support assembly 140 according to at least one embodiment of the present disclosure are shown. The support assembly 140 is configured to support the anvil 120 in an internal space 144 of the workpiece 102 during a welding process (such as, for example, a friction stir welding process). The support assembly 140 advantageously enables friction stir welding on workpieces that may require friction stir welding (whether due to certain metals, metal alloys, or otherwise), but where the internal space of the workpiece cannot support a conventional anvil. Thus, the support assembly 140 enables support of an anvil in internal spaces that lack the room to support a conventional anvil, thereby enabling friction stir welding on work pieces that previously may not have been friction stir welded.

The workpiece 102 may comprise a wall 142 forming a cylinder having an at least a partially enclosed volume defining the internal space 144. In other words, the at least partially enclosed volume may be defined by a cylindrical wall with an opening at a first end (e.g., a top of the cylindrical wall) and/or an opening at a second end (e.g., a bottom of the cylindrical wall). The wall 142 may have a first edge 146 extending between the first surface 128 and the second surface 130 (e.g., an interior surface) and a second edge 148 spaced from the first edge 146. In other embodiments the workpiece 102 may be any shape or size. For example, the workpiece 102 may be a partially enclosed sphere.

In the illustrated embodiment the support assembly 140 comprises a clamp 150 configured to attach to the wall 142 and to support the anvil 120 in the internal space 144. More specifically, the clamp 150 comprises a first clamp 150A configured to attach to the first edge 146 and a second clamp 150B configured to attach to the second edge 148. It will be appreciated that in other embodiments the clamp 150 may comprise one clamp, two clamps, or more than two clamps configured to attach to any number of edges, surfaces, or walls. In the illustrated embodiment, the first clamp 150A is coupled to the second clamp 150B via an extension arm 152. In other embodiments, the clamp 150 may not comprise the extension arm 152. In still other embodiments, the extension arm 152 may be configured to couple the clamp 150 to the anvil 120. The extension arm 152 is also configured to extend or retract such that a distance between the first clamp 150A and the second clamp 150B can be increased or decreased. Thus, the first clamp 150A and the second clamp 150B can be adjusted to attach to walls of different sizes. In some embodiments, the extension arm 152 may comprise a screw jack or jackscrew configured to extend or retract the first clamp 150A and/or the second clamp 150B towards or away from each other.

As previously described, the extension arm 152 may also support the anvil 120 against the workpiece 102. The anvil 120 may be coupled to the extension arm 152 by, for example, fasteners, inserts, or the like. In some embodiments, the anvil 120 may be integrated with the extension arm 152. The anvil 120 may be positioned adjacent to the second surface 130 of the workpiece 102 and the extension arm 152, together with the first clamp 150A and the second clamp 150B, supports the anvil 120 during the welding process as the anvil 120 receives a force 138 from the welder 122. The clamp 150 and/or the extension arm 152 may be formed from a solid material such as, for example, metal, metal alloy, or plastic. It will be appreciated that the clamp 150 and the extension arm 152 may be the same material or different materials.

Figure 7:
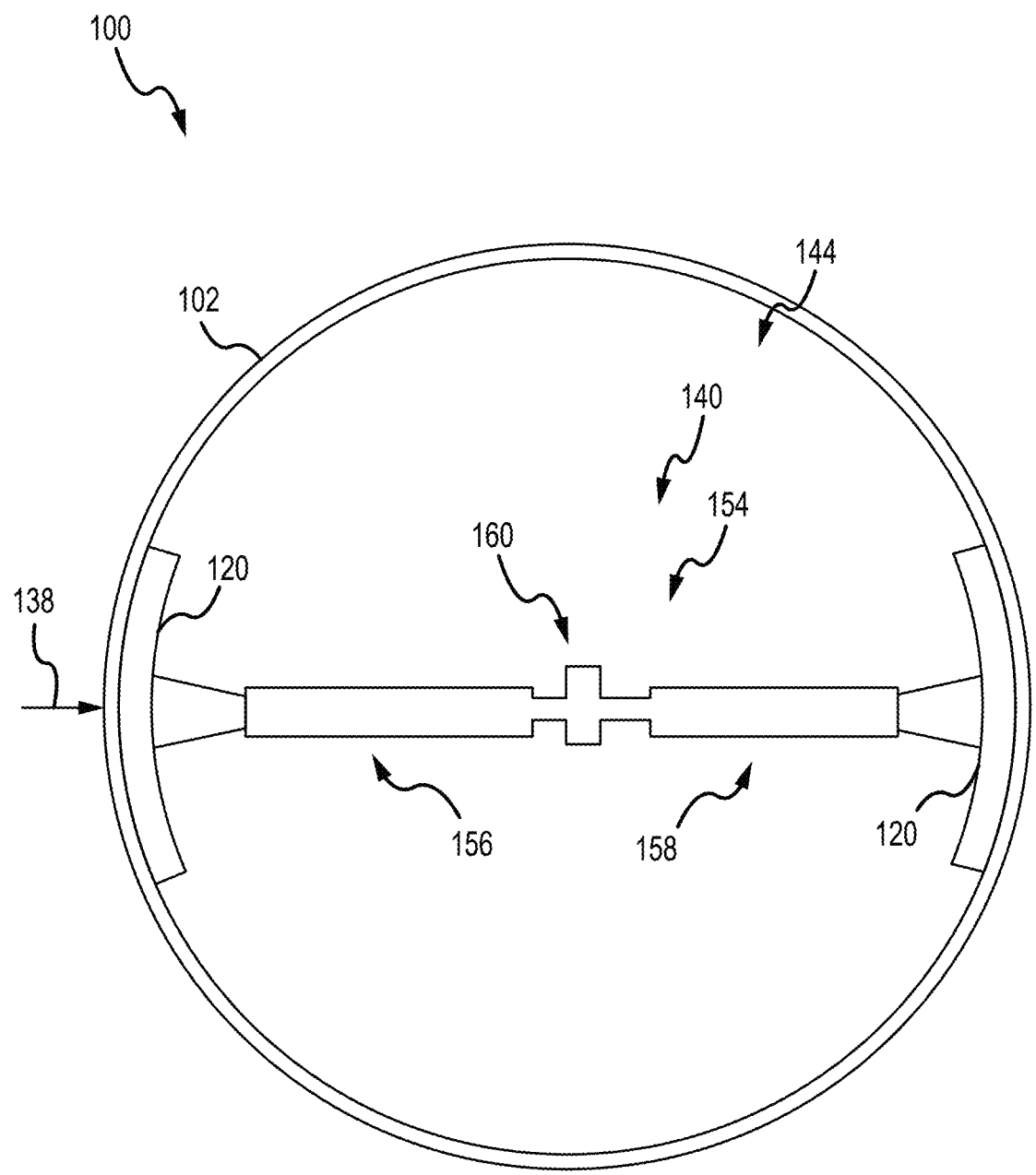
FIG. 7 is a schematic top view of an anvil according to at least one embodiment of the present disclosure.
Figure 8:
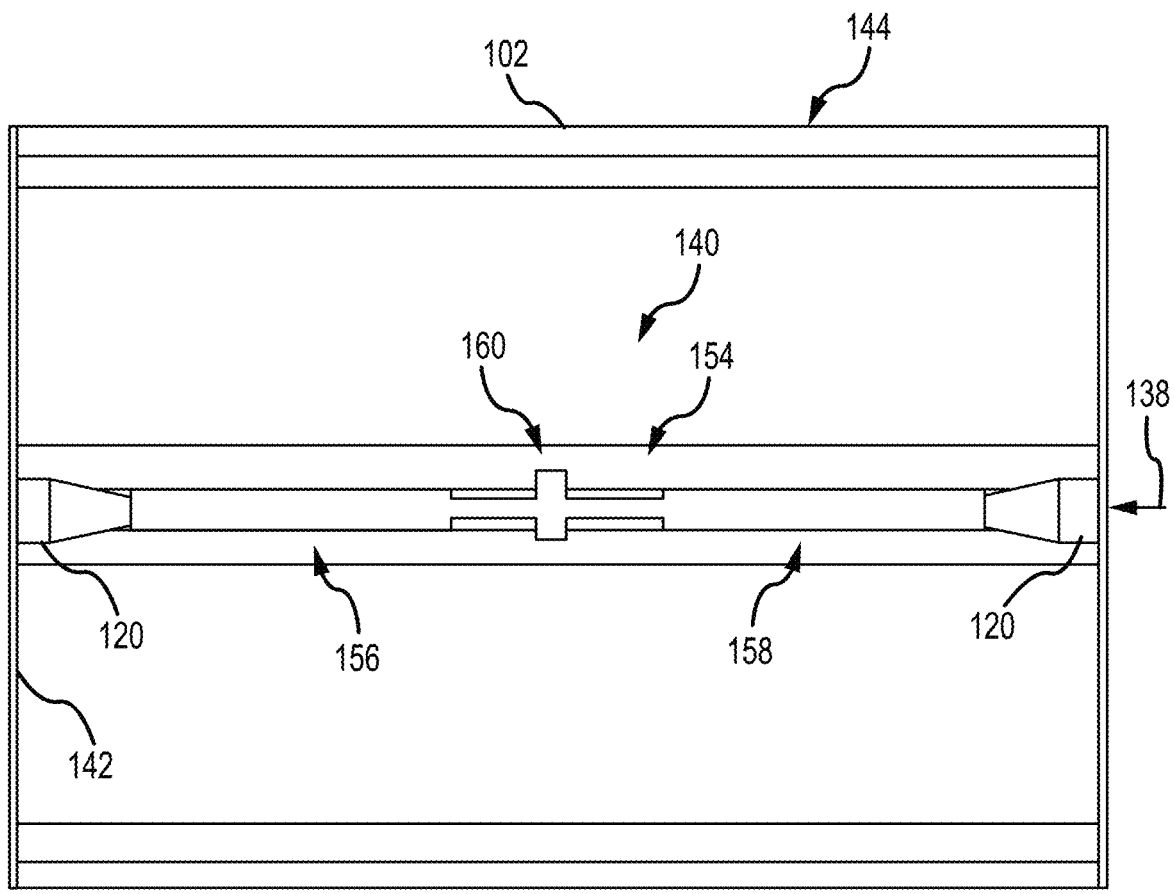
FIG. 8 is a schematic side cross-sectional view of the anvil of FIG. 6 according to at least one embodiment of the present disclosure.

Turning to FIGS. 7 and 8, a schematic top view and a schematic side view of another embodiment of a support assembly 140 are shown. In the illustrated embodiment, the support assembly 140 comprises an expandable member 154 configured to couple the anvil 120 to the workpiece 102 via a press fit. As previously described, the workpiece 102 may comprise the wall 142 forming a cylinder defining a partially enclosed volume or interior space 144. The wall 142 may also have the first surface 128 (e.g., an outer surface) and the second surface 130 (e.g., an interior surface).

The at least one expandable member 154 may be configured to support the anvil 120 such that the anvil 120 abuts the second surface 130 of the workpiece 102 at a first location and the expandable member 154 extends from the anvil 120 across the interior space 144 and abuts the second surface 130 of the workpiece 102 at a second location diametrically opposite the first location. In other words, the expandable member 154 is configured to span across the workpiece 102 to form a press fit such that the expandable member 154 can provide support for the pressure and process loads exerted on the anvil 120 by the welder 122. In the illustrated embodiment, the expandable member 154 comprises a first member 156 coupled to a second member 158 by an expander 160. The expander 160 may comprise, for example, a screw jack or jackscrew configured to extend or retract the first member 156 from or to the second member 158 or vice versa. An anvil 120 may be coupled to an end of each of the first member 156 and the second member 158, though in other embodiments an anvil 120 may be coupled to one of the first member 156 or the second member 158. The anvil 120 may be coupled to the first member 156 and/or the second member 158 by, for example, fasteners, inserts, or the like. In some embodiments, the anvil 120 may be integrated with the first member 156 and/or the second member 158.

The support assembly 140, whether formed of clamps, expandable members, or any other tooling configured to position and support the anvil 120 adjacent to the workpiece 102, is configured to support the process loads or forces exerted by the welder 122 during a welding process (such as a FSW process). In some embodiments, the anvil 120 and the workpiece 102 are stationary and the welder 122 is moveable relative to the workpiece 102 during such welding process. In other embodiments, the welder 122 is stationary and the workpiece 102 and the anvil 120 are movable relative to the welder 122.

Figure 9A:
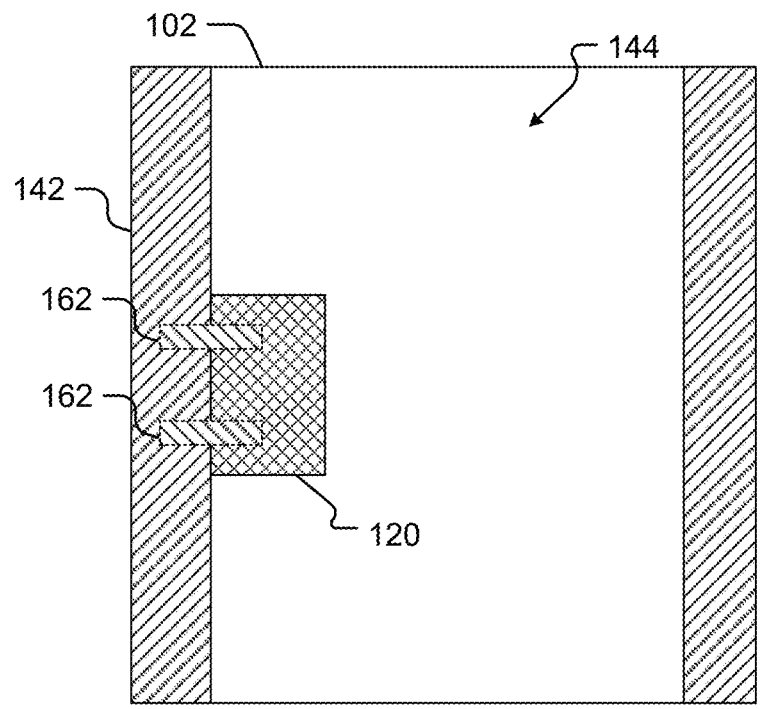
FIG. 9A is a schematic side cross-sectional view of an anvil according to at least one embodiment of the present disclosure.
Figure 9B:
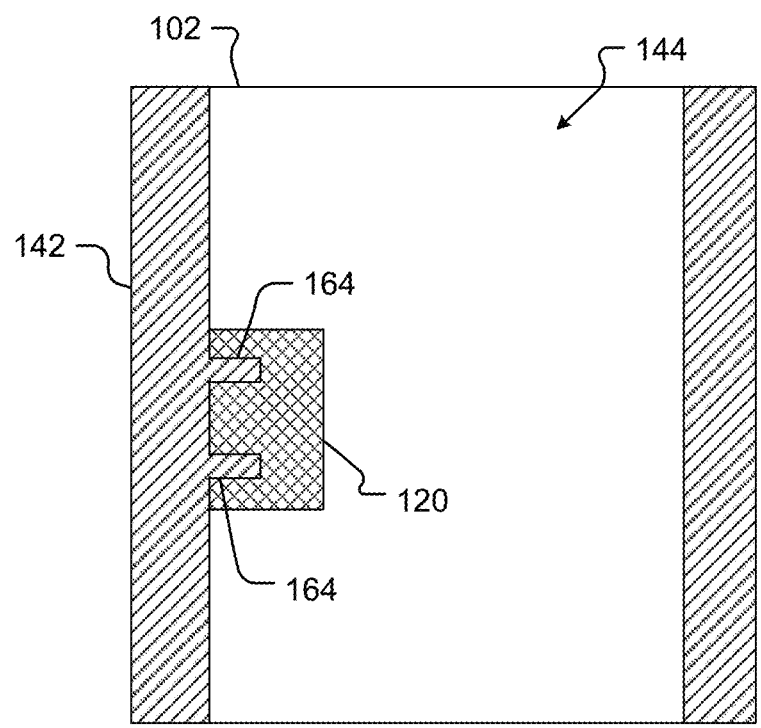
FIG. 9B is a schematic side cross-sectional view of an anvil according to at least one embodiment of the present disclosure.

Turning to FIGS. 9A and 9B, in some embodiments, the anvil 120 can be directly adapted or attached to the workpiece 102. For example, the anvil 120 can be connected or attached to the workpiece 102 by fasteners 162 as shown in FIG. 9A. In another example, the anvil 120 can be attached to the workpiece 102 by inserts 164 strategically integrated into the workpiece 102 as shown in FIG. 9B.

Figure 10:
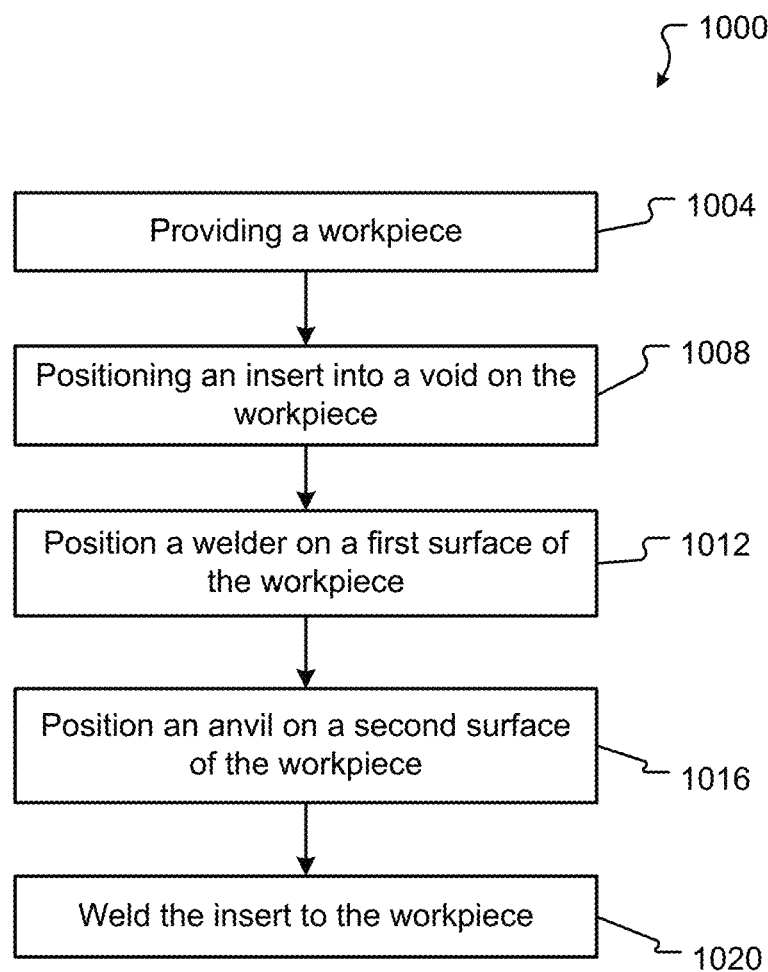
FIG. 10 is a flowchart according to at least one embodiment of the present disclosure.

FIG. 10 depicts a method 1000 that may be used, for example, for welding an insert such as the insert 118 to a workpiece such as the workpiece 102. The method 1000 (and/or one or more steps thereof) may be carried out or otherwise performed, for example, by a user such as a welder.

The method 1000 comprises providing a workpiece (step 1004). The workpiece may be the same as or similar to the workpiece 102. As previously described, the workpiece may comprise a wall such as the wall 142 having a first surface such as the first surface 128 (e.g., an exterior wall) opposite a second surface such as the second surface 130 (e.g., an interior surface). The wall may form a cylinder having an at least a partially enclosed volume defining the internal space. The wall may have a first edge such as the first edge 146 extending between the first surface and the second surface and a second edge such as the second edge 148 spaced from the first edge. In other embodiments the workpiece may be any shape or size. For example, the workpiece may be a partially enclosed sphere.

In embodiments where a welding system (which may be the same as or similar to the welding system 100) such as an SR-FSW system (which may be the same as or similar to the SR-FSW system 100A) is used to weld the workpiece 102, a void such as the void 114 may be left in the workpiece by the SR-FSW system after a welding process. More specifically, the SR-FSW system includes a weld pin that cannot be retracted from the workpiece when the welding process is complete. Thus, a void may be left by the weld pin at the end of the welding process.

The method 1000 also comprises positioning an insert into the void on the workpiece (step 1008). To fill the void, an insert such as the insert 118 may be inserted into the void. The insert may be, for example, aluminum, though in other embodiments the insert may be any type of material (e.g., aluminum alloy, steel, titanium, etc.) compatible with the welding operation. In embodiments where the void comprises a hole, the insert is cylindrical so as to fit into the void. In other instances, the insert may be any shape to fit the void.

The method 1000 also comprises positioning a welder adjacent to the first surface of the workpiece (step 1012). The welder may be the same as or similar to the welder 122 of a FSW system such as the FSW system 100B. The welder may comprise a pin such as the pin 124 that is rotatable and can be extended into or retracted from the workpiece. The FSW system also comprises an anvil such as the anvil 120. The anvil may have a length or an arc length of about 3 feet or less. In other embodiments the anvil may have a length or an arc length greater than 3 feet.

The method 1000 also comprises positioning the anvil adjacent to the second surface of the workpiece (step 1016). The anvil may be adjacent to the second surface and supported by a support assembly such as the support assembly 140. In other embodiments, the anvil is directly attached or coupled to the workpiece.

The support assembly is configured to support the anvil in the internal space of the workpiece during a welding process. More specifically, the support assembly is configured to support the process loads or forces exerted by the welder during the welding process. In some embodiments, the anvil and the workpiece are stationary and the welder is moveable relative to the workpiece during such welding process. In other embodiments, the welder is stationary and the workpiece and the anvil are movable relative to the welder.

In some embodiments the support assembly may comprise a clamp such as the clamp 150 which may have one clamp, two clamps, or more than two clamps. In embodiments where the clamp comprises two clamps, a first clamp such as the first clamp 150A may be configured to configured to attach to the first edge of the workpiece and a second clamp such as the second clamp 150B may be configured to attach to the second edge of the workpiece. The first clamp may be coupled to the second clamp via an extension arm such as the extension arm 152. In other embodiments, the clamp may not comprise the extension arm. In still other embodiments, the extension arm may be configured to couple the clamp to the anvil. The extension arm is also configured to extend or retract such that a distance between the first clamp and the second clamp can be increased or decreased. Thus, the first clamp and the second clamp can be adjusted to attach to walls of different sizes. In some embodiments, the extension arm may comprise a screw jack or jackscrew configured to extend or retract the first clamp and/or the second clamp.

As previously described, the extension arm may also support the anvil against the workpiece. The anvil may be coupled to the extension arm by, for example, fasteners, inserts, or the like. In some embodiments, the anvil may be integrated with the extension arm. The anvil may be positioned adjacent to the second surface of the workpiece and the extension arm, together with the first clamp and the second clamp, supports the anvil during the welding process.

In other embodiments, the support assembly may comprise an expandable member such as the expandable member 154 configured to couple the anvil to the workpiece via a press fit. The at least one expandable member may be configured to support the anvil such that the anvil abuts the second surface of the workpiece at a first location and the expandable member extends from the anvil across the interior space and abuts the second surface of the workpiece at a second location diametrically opposite the first location. In some embodiments, the expandable member comprises a first member such as the first member 156 coupled to a second member such as the second member 158 by an expander such as the expander 160. The expander may comprise, for example, a screw jack or jackscrew configured to extend or retract the first member from or to the second member or vice versa. An anvil may be coupled to an end of each of the first member and the second member, though in other embodiments an anvil may be coupled to one of the first member or the second member. The anvil may be coupled to the first member and/or the second member by, for example, fasteners, inserts, or the like. In some embodiments, the anvil may be integrated with the first member and/or the second member.

The method 1000 also comprises welding the insert to the workpiece (step 1020). During the welding process, the pin is rotated and extended into the workpiece. The rotation of the pin and a forge force exerted by the welder onto the workpiece results in frictional heat used to weld the workpiece and/or the insert. The welding system can weld one or more weld paths until the insert is welded to the workpiece thereby sealing the void. The one or more weld paths may comprise one weld path, two weld paths, or more than two weld paths. The one or more weld paths may be linear, may be circular around the insert, or may form a trajectory of any shape.

More specifically during the welding process, the pin is configured to rotate, extend or retract into the workpiece, and to move along a trajectory to weld the insert to the workpiece. At a first step, the pin extends gradually into the workpiece as the pin moves along the trajectory and, in a second step, the pin withdraws gradually from the workpiece as the pin moves along the trajectory. More specifically, the pin begins at a weld staring position and as the pin is moved towards the insert, the pin is extended into the workpiece. The combination of a rotation of the pin, a force exerted by the welder, and the anvil positioned opposite the welder, welds the workpiece by friction stir welding. As the pin passes through the insert, the pin may be extended substantially through the workpiece and towards the anvil. Once the pin is past the insert, the pin may be retracted away from the anvil and out of the workpiece. Such welding process may result in the insert being fully incorporated or welded to the workpiece, thereby preventing any leaks from the void and resulting in increased strength of the workpiece at the void as compared to conventional methods of sealing the void.

The present disclosure encompasses embodiments of the method 1000 that comprise more or fewer steps than those described above, and/or one or more steps that are different than the steps described above.

As noted above, the present disclosure encompasses methods with fewer than all of the steps identified in FIG. 10 (and the corresponding description of the method 1000), as well as methods that include additional steps beyond those identified in FIG. 10 (and the corresponding description of the method 1000). The present disclosure also encompasses methods that comprise one or more steps from one method described herein, and one or more steps from another method described herein. Any correlation described herein may be or comprise a registration or any other correlation.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A welding system for filing a void on a curved metal workpiece, the workpiece having a first surface with a first surface area and an opposite second surface with a second surface area, the second surface defining at least a partially enclosed volume, the workpiece having a first edge and a second opposite edge, comprising:
   a metal insert configured to fill the void;
   a welder configured to perform a friction stir welding process on the curved metal workpiece and the metal insert, and the welder is capable of being positioned adjacent the first surface;
   a support assembly having a first clamp, a second clamp and an extension arm connecting the first and second clamps, the first clamp configured to engage the first edge of the curved workpiece and the second clamp configured to engage the second edge of the curved workpiece; and
   an anvil coupled to the extension arm and capable of being positioned adjacent the second surface and opposite the welder, the anvil having a third surface area less than the second surface area of the curved workpiece.

2. The system of claim 1, wherein the workpiece and the insert are aluminum alloys.

3. The system of claim 1, wherein the void is a result of a self-reacting friction stir welding process.

4. The system of claim 1, wherein the curved metal workpiece forms a cylinder.

5. The system of claim 1, wherein the anvil and the workpiece are stationary and the welder is movable relative to the workpiece.

6. The system of claim 1, wherein the welder is stationary and the workpiece and the anvil are movable relative to the welder.

7. The system of claim 1, wherein the welder comprises a rotatable pin that is extendable and retractable and configured to weld the insert and the workpiece by rotating and extending into the workpiece, moving along a trajectory until the insert is welded to the workpiece, and retracting from the workpiece.

8. The system of claim 7 wherein, in a first step, the pin extends gradually into the workpiece as the pin moves along the trajectory and, in a second step, the pin withdraws gradually from the workpiece as the pin moves along the trajectory.

9. The welding system of claim 1, wherein the extension arm has a length that is configured to be increased and decreased.

10. The welding system of claim 1, wherein the workpiece is cylindrical.

11. The welding system of claim 1, wherein the anvil is repositionable between the first and second clamp.

* * * * *